US009428850B2

(12) United States Patent
Yu et al.

(10) Patent No.: US 9,428,850 B2
(45) Date of Patent: Aug. 30, 2016

(54) PROCESS OF MAKING PAN-BASED CARBON FIBER

(71) Applicant: DONGHUA UNIVERSITY, Shanghai (CN)

(72) Inventors: Muhuo Yu, Shanghai (CN); Huaiping Rong, Shanghai (CN); Keqing Han, Shanghai (CN); Zhaohua Wang, Shanghai (CN); Yiwei Zhang, Shanghai (CN); Qinli Dong, Shanghai (CN)

(73) Assignee: DONGHUA UNIVERSITY, Shanghai (CN)

( * ) Notice: Subject to any disclaimer, the term of this patent is extended or adjusted under 35 U.S.C. 154(b) by 4 days.

(21) Appl. No.: 14/519,076

(22) Filed: Oct. 20, 2014

(65) Prior Publication Data

US 2015/0035183 A1 Feb. 5, 2015

Related U.S. Application Data

(62) Division of application No. 13/262,620, filed as application No. PCT/CN2010/000036 on Jan. 11, 2010, now Pat. No. 8,906,278.

(30) Foreign Application Priority Data

Mar. 31, 2009 (CN) .......................... 2009 1 0048603
Jun. 9, 2009 (CN) .......................... 2009 1 0052721
Jun. 17, 2009 (CN) .......................... 2009 1 0053212
Sep. 17, 2009 (CN) .......................... 2009 1 0195794
Nov. 6, 2009 (CN) .......................... 2009 1 0198444

(51) Int. Cl.

| | |
|---|---|
| ***C01B 31/02*** | (2006.01) |
| ***D01D 1/02*** | (2006.01) |
| ***D01D 5/12*** | (2006.01) |
| ***D01D 5/16*** | (2006.01) |
| ***D02J 1/22*** | (2006.01) |
| ***D01F 9/22*** | (2006.01) |
| ***D01D 1/04*** | (2006.01) |
| ***D01D 5/08*** | (2006.01) |
| ***D01D 10/02*** | (2006.01) |
| ***D01F 1/10*** | (2006.01) |
| ***D01F 6/18*** | (2006.01) |
| ***D01D 5/06*** | (2006.01) |
| ***D01D 10/06*** | (2006.01) |
| ***D01F 1/02*** | (2006.01) |
| ***B05D 1/00*** | (2006.01) |
| ***B05D 1/18*** | (2006.01) |

(52) U.S. Cl.

CPC ................ *D01F 9/22* (2013.01); *B05D 1/007* (2013.01); *B05D 1/18* (2013.01); *D01D 1/04* (2013.01); *D01D 5/06* (2013.01); *D01D 5/08* (2013.01); *D01D 10/02* (2013.01); *D01D 10/06* (2013.01); *D01F 1/02* (2013.01); *D01F 1/10* (2013.01); *D01F 6/18* (2013.01); *D01F 9/225* (2013.01); *D02J 1/224* (2013.01); *D10B 2101/12* (2013.01); *D10B 2101/122* (2013.01); *D10B 2321/10* (2013.01)

(58) Field of Classification Search

CPC .......... C01B 31/02; D01D 1/02; D01D 5/06; D01D 5/12; D01D 5/16; D01D 10/02; D01D 10/06; D01F 1/02; D01F 1/10; D01F 6/18; D01F 9/22; D01F 9/225; D02J 1/22; D02J 1/221

USPC ......... 264/29.2, 29.6, 29.7, 178 F, 182, 184, 264/203, 210.5, 210.6, 210.8, 211, 211.14, 264/211.15, 211.16, 211.17, 233; 423/447.1, 447.6, 447.7, 447.8

See application file for complete search history.

(56) References Cited

U.S. PATENT DOCUMENTS

| | | | |
|---|---|---|---|
| 2,733,121 | A | 1/1956 | Griffith, Jr. et al. |
| 4,185,059 | A | 1/1980 | Reinehr et al. |
| 5,560,991 | A | 10/1996 | Patel et al. |
| 8,906,278 | B2 | 12/2014 | Yu et al. |
| 9,334,586 | B2 | 5/2016 | Yu et al. |
| 2006/0100323 | A1 | 5/2006 | Schmidt et al. |
| 2007/0142515 | A1 | 6/2007 | Higuchi et al. |

| | | | |
|---|---|---|---|
| 2015/0035196 A1 | 2/2015 | Yu et al. | |
| 2015/0035197 A1 | 2/2015 | Yu et al. | |
| 2015/0037509 A1 | 2/2015 | Yu et al. | |

FOREIGN PATENT DOCUMENTS

| | | | |
|---|---|---|---|
| CN | 1461829 | A | 12/2003 |
| CN | 1478930 | A | 3/2004 |
| CN | 1740411 | A | 3/2006 |
| CN | 101250770 | A | 8/2008 |
| CN | 101260575 | A | 9/2008 |
| CN | 101545148 | A | 9/2009 |
| CN | 101586265 | A | 11/2009 |
| CN | 101597820 | A | 12/2009 |
| JP | 46-34939 | B | 10/1971 |
| JP | 61-69814 | A | 4/1986 |
| JP | 10-265674 | A | 10/1998 |
| JP | 2005-256222 | A | 9/2005 |
| WO | 2010/111882 | A1 | 10/2010 |

OTHER PUBLICATIONS

International Search Report for PCT/CN2010/000036 dated Apr. 22, 2010.

International Preliminary Report on Patentability for PCT/CN2010/000036 dated Oct. 13, 2011.

Restriction Requirement for U.S. Appl. No. 13/262,620 dated Dec. 11, 2013.

Office Action for U.S. Appl. No. 13/262,620 dated Apr. 7, 2014.

Notice of Allowance for U.S. Appl. No. 13/262,620 dated Jul. 18, 2014.

Office Action for U.S. Appl. No. 14/518,944 dated Dec. 8, 2015.

Li, Z., "Study on ionic liquid and PAN/ionic liquid diluted solution," Chinese Doctoral Dissertations & Master's Theses Full Text Database (Master) Engineering Science and Technology I, Jul. 16, 2005-Aug. 15, 2005.

ShenRui et al., "Study on the Gel-spinning Process for Preparing Polyacrylonitrile Carbon Fiber Filament", Techno-Economics in Petrochemicals, Apr. 2007, vol. 23, No. 2, pp. 41-44.

Notice of Allowance for U.S. Appl. No. 14/519,002 dated Jan. 25, 2016.

Office Action for U.S. Appl. No. 14/518,944 dated Apr. 12, 2016.

Notice of Allowance for U.S. Appl. No. 14/518,944 dated Jun. 22, 2016.

*Primary Examiner* — Leo B Tentoni

(74) *Attorney, Agent, or Firm* — Nixon Peabody LLP; Joseph Bach, Esq.

(57) ABSTRACT

Processes for producing carbon fiber, the filament thereof and pre-oxidized fiber are provided. In one embodiment, the gel spinning of polyacrylonitrile filament is achieved by using small-molecule gelling agent, and the carbon fiber obtained thereby is increased by 15% to 40% in tensile strength and by 20% to 35% in toughness. In another embodiment, the melt spinning process of polyacrylonitrile is conducted by using imidazole type ion liquid as plasticizer, the process reduces environment pollution, is suitable for industrial production and the fiber produced thereby is improved in its strength. In yet another embodiment, polyacrylonitrile pre-oxidized fiber is produced by melt spinning, so low cost and controllable pre-oxidization of polyacrylonitrile can be achieved. In a further embodiment, high strength carbon fiber is manufactured by using polymer thickening agent. In another further embodiment, low cost and controllable pre-oxidization of polyacrylonitrile is achieved by conducting pre-oxidization before spinning, minimizing skin-core structure, so as to produce high performance carbon fiber, and reduce the production cost of carbon fiber greatly.

7 Claims, 7 Drawing Sheets

PROCESS OF MAKING PAN-BASED CARBON FIBER

CROSS-REFERENCE TO RELATED APPLICATIONS

This application is a divisional application of U.S. patent application Ser. No. 13/262,620 filed on Sep. 30, 2011, which is a National Phase of International Application No. PCT/CN2010/000036, which was filed on Jan. 11, 2010, and which claims priority to and the benefit of Chinese Patent Application Nos. 200910048603.8 filed on Mar. 31, 2009, 200910052721.6 filed on Jun. 9, 2009, 200910053212.5 filed on Jun. 17, 2009, 200910195794.0 filed on Sep. 17, 2009, and 200910198444.X filed on Nov. 6, 2009, and the disclosures of which are hereby incorporated herein by reference in their entireties.

TECHNICAL FIELD

The present invention belongs to the field of processing technology of carbon fibres. In particular, the present invention relates to processes for producing carbon fibre, precursor fibre and pre-oxidized fibre thereof.

BACKGROUND ART

Carbon fibre is widely used in high-tech industrial field due to its excellent properties such as low density, high strength, high modulus, high temperature resistance, corrosion resistance, friction resistance, and fatigue resistance, etc., especially has a very potential application in aerospace field. The production of carbon fibre generally comprises spinning, pre-oxidizing and carbonizing process.

The properties of carbon fibre, to a great extent, depend on its precursor fibre. The low quality of polyacrylonitrile (PAN) based precursor fibre has been a "bottleneck" restricting the development of carbon fibre industry in china for many years. It is urgent to effectively improve the quality of PAN precursor fibre, thereby improving the properties of carbon fibre. Compared with precursor fibre produced abroad, homemade precursor fibre has larger fineness, lower strength, larger dispersion coefficient, more defects, cracks and voids, lower crystallinity and orientation, etc, which are serious problems existing during production of precursor fibre. As far as quality and yield of precursor fibre are concerned, quality is the primary problem at present. The tensile strength of most carbon fibres produced from homemade precursor fibre is about 3.5 GPa, which can not fulfil the requirement for use at present, therefore its application is limited. Meanwhile, the poor stability of precursor fibre quality is an obstacle to scale production.

A main feature of PAN resin is its high melting point (317° C.). It is decomposed before melted when it is heated, therefore only solution spinning can be used to produce PAN fibre. A large amount of toxic or corrosive chemical solvents are required in industrialized wet spinning and dry spinning, and recovery and purification of the used solvents, washing fibres with water and drying, as well as "three wastes" treatment are necessary during production. If the melt spinning of PAN fibre can be realized, not only solvent exhaustion but also recovery step and devices for solvent recovery and washing step can be saved, therefore the manufacturing cost can be substantially lowered, and the serious environmental problems caused by solvents are eliminated.

It was firstly reported by Coxe in 1952 that adding a small amount of water into PAN copolymers can lower its melting point to that required for melt spinning. This report provided a possibility for melt spinning of PAN fibre. Since then, especially, the last 20 years, a lot of researches on melt spinning of PAN are carried on abroad by many foreign companies such as ACC Co., Du Pont Co, BP Chemical Co., Mitsubishi Rayon Co., Ltd., Exlan Co. Ltd, Asahi Kasei Corporation, etc.

In general, there are two ways for melt spinning of PAN: plasticized melt spinning and non-plasticized melt spinning, wherein plasticized melt spinning comprising the following aspects: Plasticized by solvent (such as DMSO and PC and the like): PAN powder which had been plasticized by PC can be melted and be extruded continuously into filaments. For example, the study on Rheological properties of mixture of PAN and PC in weight ratio of 50:50 at 180° C. and 240° C. shows that the blend fluid thereof is shear thinning fluid and its viscosity is lower than that of conventional plastic PE; $\hat{2}$ Plasticized by non-similar polymer such as PEG reported in literatures: PAN fibre is prepared by melt spinning of PAN and PEG mixture by Asahi Chemical Co. Ltd, the tensile strength of which can be up to 4.68 cN/dtex; ③ Plasticized by low molecular weight PAN: 91 parts copolymer of PAN and methyl acrylate (copolymerization ratio being 85:15 by weight, specific viscosities being 0.68) and 9 parts another copolymer of PAN and methyl acrylate (copolymerization ratio being 85:15 by weight, molecular weight being 4800) are mixed and melt extruded at 215° C., and spun at 1200 m/min to obtain fibre, which is drawn in boiling water to 4 times to obtain fibre having a linear density of 1.17 dtex, a tensile strength of 5.26 cN/dtex, and elongation at break of 12.3%, as reported by Mitsubishi Rayon Co., Ltd. And fibre satisfying certain requirements can also be melt spun by reducing AN unit content of low molecular weight PAN for plasticizing appropriately; ④ Plasticized by water, which is the most studied method: PAN and certain amount of water become melt under a certain pressure and temperature, which is then extruded into spinning pack and then spinning duct through spinning machine, and drawn. There is full of water vapour in the spinning duct to prevent fibre foaming due to rapidly water evaporation. The obvious characteristics of this method lie in that the only use of inexpensive and non-toxic water will save recovery procedures and devices and will not produce pollution to the environment. It was reported in literatures that PAN fibre obtained from melt spinning by using water as plasticizer can be used as precursor fibre for carbon fibre and have a molecular weight of 100,000-250,000, strength of 3.6 cN/dtex, Young modulus of 97 cN/dtex, and the carbon fibre obtained by carbonization has an average strength of 15 cN/dtex, Young modulus of 1080~1310 cN/dtex and sonic modulus over 1000 cN/dtex. Recently, aerospace grade carbon fibre prepared from PAN fibre as precursor fibre obtained from melting spinning and plasticized by water is also developed by Celion Carbon Fibres Company. However, this method also has the following problems: A. The extrusion pressure of screw is relatively high due to the poor rheological properties of hydrous melts; B. To prevent the surface of fibre from being coarse and microvoids being formed thereon which result in poor mechanical properties of fibre due to too quick water evaporation during coagulation, saturated steam of certain pressure is required to be maintained in the spinning duct, thereby presenting a requirement for devices; C. It is difficult to control the process due to the narrow temperature range for melt spinning of hydrous melt, therefore industrialization of melt spinning of hydrous melt has not been realized yet at present.

During the manufacturing of carbon fibre, pre-oxidization is a key procedure and the most time-consuming process, the structure and properties of the final carbon fibre to a great extent depend on the structural transformation during pre-oxidization. Since there is dramatic structural transformation during pre-oxidization, defects are easily caused, resulting in a decrease of the mechanical properties of carbon fibre. Therefore the structure transformation and control of structure during pre-oxidization are very important to the control of the structure and properties of carbon fibre.

All processes for pre-oxidizing PAN precursor fibre for carbon fibre reported in literature till now pre-oxidize precursor fibre in air. That is to say, all PAN based carbon fibres are obtained by spinning, pre-oxidizing and carbonizing processes sequentially. However, such an order will result in the following shortcomings: 1) During pre-oxidization of PAN precursor fibre, uneven morphological structure of fibre will be caused if there is a gradient difference of pre-oxidization degree across the cross-section of fibre, such as common skin-core structure, which will result in uneven radical contraction across the cross-section of fibre and poor preferred orientation and tensile performance, and therefore decrease of properties of final carbon fibre. 2) The pre-oxidization process is very time-consuming, its temperature is high and equipments are complicated, resulting in the improved cost for pre-oxidization and therefore eventually, the whole cost of manufacturing carbon fibre are substantially increased. Therefore, the pre-oxidization of PAN fibre is very important. Pre-oxidization is a systemic engineering, revolves in not only equipments and means of pre-oxidization, but also process parameters (such as temperature, time, drawing, medium, flow and direction of medium), reaction and change in PAN fibre during pre-oxidization, evaluation index of structure and pre-oxidization degree of pre-oxidized fibre, etc.

In recent years, researchers at home and abroad take more and more efforts on pre-oxidization of PAN precursor fibre. However, their researches are carried on pre-oxidization of PAN precursor fibre after spinning. For example, PAN precursor fibre are also pre-oxidized by three huge companies which produce carbon fibre, namely, Toray, TOHO, Mitsubishi Rayon. Pre-oxidization is double diffusion process and oxygen diffuses from surface to inside of fibre. As the pre-oxidization reaction continues, compact thin layer with ladderlike structure is formed on the surface of fibre at first, blocking the diffusion of oxygen, and then a skin-core structure is formed, resulting in defects of carbon fibre.

Manufacturing process using layer-based thermal stabilized furnace with 6-12 zones for heating and drawing which can produce pre-oxidization fibre with high quality is disclosed in Chinese Patent No.s 02136722.1 and 200810036189.4. However, the equipments for this process are extremely complicated, the temperature is difficult to control and the cost is high.

The industrial objects of carbon fibre production are to lower the cost, improve the properties and productivity of carbon fibre. For quick pre-oxidization and excellent pre-oxidized fibre, the process of pre-oxidization should be optimized. The key for lowering production cost is shorten the time for pre-oxidization which causes easily skin-core structure and subsequently larger voids and defects during carbonizing procedure, thereby resulting in decrease of mechanical properties of carbon fibre Skin-core structure is not obvious by lowering temperature and prolonging time of pre-oxidization, which is beneficial to properties of carbon fibre, however, also lowers the production efficiency. Thus an excellent process for pre-oxidization has not been developed yet.

During the production of carbon fibre (or graphite fibre), especially carbon fibre obtained by using PAN precursor fibre as starting material, the formation of voids on surface is caused by defects of precursor fibre itself and evenness problems during production. Those voids induce stress concentration when fibre is subjected to force, which is also the main reason for break of monofilament. Repairing voids on surface has been concerned in carbon fibre production field, but there is not good means for it until now, and the only way at present is to sacrifice monofilaments with voids, therefore the overall mechanical properties of carbon fibre are substantially decreased.

As disclosed in Chinese Patent No. 02121070.5, environment of an ethyne reaction is created by heating through focusing electromagnetic field induction to induce ethyne to be cracked into hydrogen and carbon atoms near high temperature carbon fibres. Carbon atoms deposits on the surface of carbon fibres to repair defects on surface thereby reinforcing carbon fibre. However, the equipments for this process are very complicated and costly, uneasily to handle and the efficiency is low.

SUMMARY OF THE INVENTION

The technical problem to be solved by the present invention is to provide processes for producing carbon fibre, precursor fibre and pre-oxidized fibre thereof to overcome the problems existing in current carbon fibre production such as poor quality of precursor fibre, high cost for producing pre-oxidized fibre and carbon fibre as well as serious environmental pollution.

In an embodiment, the present invention provides a gel spinning process for producing a PAN-based precursor fibre, comprising the following steps:

a) mixing an anhydrous PAN powder and a solvent in a weight ratio from 5:100 to 20:100, followed by heating at a temperature between 70° C. and 110° C. until the PAN powder is completely dissolved to obtain a solution;

b) adding a small-molecule gelling agent to the solution from step a) to obtain a mixture, said small-molecule gelling agent being in an amount of from 2% to 5% by weight of the solution, and the mixture being mechanically stirred for 1 hour to obtain a uniformly mixed spinning solution;

c) transferring the spinning solution from step b) to a wet spinning machine and spinning by using conventional wet spinning process for producing PAN based precursor fibre, thereby obtaining the PAN-based precursor fibre.

The solvent in step a) is selected from the group consisting of dimethylformamide (DMF), dimethylacetamide (DMAc), dimethyl sulfoxide (DMSO), sodium thiocyanate (NaSCN), nitric acid ($HNO_3$), and Zinc chloride ($ZnCl_2$), and preferably DMF or DMSO.

The heating in step a) is preformed by means of oil bath or sand bath.

The small-molecule gelling agent in step b) is one or more selected from the group consisting of $H_2O$, glycerol, glycol, urea, and thiourea.

In this embodiment, the spinning solution is transformed to three-dimensional network structure directly in cooled air by heat-induced gelatinization through adding some non-solvents into the spinning solution. Once such structure is formed, skin-core structure is avoided because only double diffusion of solvent and non-solvent exists in coagulation bath, and phase separation will not occur, thereby the tensile strength of precursor fibre for PAN based carbon fibres can be increased.

In an embodiment, the present invention provides a melt spinning process for producing a PAN fibre by using an ionic liquid as plasticizer, comprising the following steps:

a) mixing an anhydrous PAN powder and an ionic liquid uniformly in a weight ratio from 1:1 to 1:0.25 to obtain a mixture;

b) adding the mixture from step a) into a hopper of twin-screw spinning machine to conduct melt spinning with a screw rotation speed of 40-120 r/min at a predetermined spinning temperature ranging from 170° C. to 220° C.; and a filament from the spinning machine being drawn directly by means of dry-heat drawing without a water bath, with a drawing temperature ranging from 80° C. to 180° C. and a drawing ratio of 1 to 8;

c) washing the drawn fibre with water, thermosetting and winding to obtain the PAN fibre.

The plasticizer in step a) is a disubstituted imidazole-based ionic liquid with the structure of

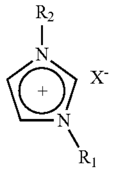

wherein $R_1$ is methyl or butyl; $R_2$ is methyl, ethyl, n-propyl, iso-propyl, n-butyl, sec-butyl or iso-butyl; X is chloride ion ($Cl^-$), bromide ion ($Br^-$), tetrafluoroborate ($BF4^-$) or hexafluorohosphorate ($PF6^-$).

The disubstituted imidazole-based ionic liquid is preferably one or more selected from the group consisting of: 1-ethyl-3-methyl imidazolium chloride ([EMIM]Cl), 1-butyl-3-methyl imidazolium chloride ([BMIM]Cl), 1-ethyl-3-methyl imidazolium bromide ([EMIM]Br), 1-ethyl-3-methyl imidazolium tetrafluoroborate ([EMIM]$BF_4$), 1-butyl-3-methyl imidazolium tetrafluoroborate ([BMIM]$BF_4$), 1-ethyl-3-methyl imidazolium hexafluorophophate ([EMIM]$PF_6$), and 1-butyl-3-methyl imidazolium hexafluorophophate ([BMIM]$PF_6$).

The temperature for washing the drawn fibre in step c) is controlled in a range from 70° C. to 90° C.

In this embodiment, melt spinning is adopted to avoid the use of a large amount of toxic or corrosive chemical solvent, without recovering and purifying the solvent used and three wastes treatment during manufacture, thereby saving not only solvent but also recovery step and devices for solvent recovery and washing step, which can substantially lower the manufacturing cost, and eliminate the serious environmental problems caused by solvent. The plasticizing effect of ionic liquid is helpful for drawing PAN fibre. Unlike precursor fibre obtained by solution spinning, which has a large amount of voids caused by double diffusion, the obtained PAN fibre hardly has voids and is compact, which is beneficial to the increase of the strength of precursor fibre.

In an embodiment, the present invention provides a melt spinning process for producing a PAN-based pre-oxidized fibre, comprising the following steps:

a) dissolving a catalyst for pre-oxidation of PAN in an ionic liquid in a weight ratio from 1:100 to 0.01:100 followed by adding PAN powder to obtain a mixture, wherein the weight ratio of PAN powder to ionic liquid is between 1:1 and 1:0.25;

b) adding the mixture from step a) to hopper of twin-screw spinning machine to conduct melting spinning while blowing an oxygen-containing gas into melting segment of the twin-screw spinning machine, wherein the flow rate of the oxygen-containing gas is between 1 ml/min and 5 ml/min, and the rotational velocity of screw is between 40 and 120 r/min, and the temperature at a feed segment is between 170° C. and 185° C., and the temperature for plasticizing is between 185° C. and 220° C., and the temperature for melting is between 185° C. and 220° C.;

c) dry-heat drawing the spun fibre directly under a temperature between 110 and 140° C. with a total draw ratio between 4 and 6, then washing the drawn fibre with water at 70-90° C., followed by thermosetting in dry hot air at 120-150° C. to give the PAN based pre-oxidized fibre.

The catalyst for pre-oxidation of PAN used in step a) is one or more selected from the group consisting of potassium permanganate, cobalt dichloride, cobalt sulphate, potassium persulfate, benzoyl peroxide, succinic acid, hydrogen peroxide, ammonia, and hydroxylamine hydrochloride.

The ionic liquid used in step a) is disubstituted imidazole-based ionic liquid, preferably one or more selected from the group consisting of 1-ethyl-3-methyl imidazolium chloride ([EMIM]Cl), 1-butyl-3-methyl imidazolium chloride ([BMIM]Cl), 1-ethyl-3-methyl imidazolium bromide ([EMIM]Br), 1-ethyl-3-methyl imidazolium tetrafluoroborate ([EMIM]$BF_4$), 1-butyl-3-methyl imidazolium tetrafluoroborate ([BMIM]$BF_4$), 1-ethyl-3-methyl imidazolium hexafluorophophate ([EMIM]$PF_6$), 1-methyl-3-butyl imidazolium hexafluorophophate ([BMIM]$PF_6$).

Preferably, the oxygen-containing gas is oxygen or air.

$KMnO_4$ is used as a catalyst so that the time for pre-oxidization is shortened and the final properties of carbon fibre are improved. $CoCl_2$ and $CoSO_4$ can also be used to catalytically improve the structure and properties of PAN. BPO, succinic acid and the like can also be used as catalyst for cyclization during the course of pre-oxidization of PAN. These catalysts or their combination can reduce the activation energy of oxidization, slower heat release, and shorten the time for pre-oxidization and lower the final temperature for pre-oxidization and improve the mechanical properties of carbon fibre.

The advantages of this embodiment are as follows:

(1) The skin-core structure is decreased and the compactness of pre-oxidized fibre is substantially increased.

The increase of compactness of pre-oxidization is greatly contributed by oxygen content, especially the radial distribution of oxygen is related to the skin-core structure along the cross-section of fibre. The key of pre-oxidization is elimination of skin-core structure of pre-oxidized fibre. Oxygen is blow through the melting section of twin-screw and diffuses from surface to inside of the melt, substantially reducing the skin-core structure of pre-oxidized fibre;

(2) Energy consumption is reduced, and therefore the cost of pre-oxidization is substantially lowered.

The pre-oxidization can be carried in a twin-screw and the melt can be uniformly oxidized under rotation of the twin-screw. Compared with the conventional pre-oxidization process, the energy consumption of the process of the invention is reduced so that the cost of pre-oxidization and further the manufacturing cost of carbon fibres are lowered.

(3) Controllable pre-oxidization of PAN is realized.

The temperature for pre-oxidization is 170° C.-220° C. and catalyst in certain ratio is added to facilitate the preoxidization. The degree of oxidization of PAN is effectively controlled by difference retention time of melt in a twin-screw, temperature for pre-oxidization and catalyst content. The oxidization is strictly controlled by adjusting the process parameters, i.e. controllable pre-oxidization of PAN is realized by controlling the time, temperature and catalyst content used for oxidization, pre-oxidization degree is improved and side reaction such as cross-linking is reduced.

(4) The devices for process are simple and the process is environmentally friendly.

The pre-oxidization of the process is carried in a twin-screw extruder which can realize a controllable pre-oxidization and sufficiently carry out the pre-oxidization, thereby avoiding the use of existing expensive and complicated devices for pre-oxidization. The melt spinning is used to produce PAN pre-oxidized fibre in the process, and avoid the use of a large amount of toxic or corrosive chemical solvent, without recovering and purifying the solvent used and three wastes treatment during manufacture. Not only solvent but also recovery step and devices for solvent and washing step are saved, therefore the manufacturing cost is substantially lowered, and the serious environmental problems caused by solvent are eliminated.

The tensile strength of carbon fibre obtained by carbonizing the pre-oxidized fibre from this embodiment is increased from 3.3-3.5 GPa to 4.0-4.6 GPa and has an advantage of lower cost compared with the high strength carbon fibres commercial available at present.

In an embodiment, the present invention provides a process for producing a high-strength carbon fibre, comprising the following steps:

a) mixing 0.01-2 parts by weight of a carbon nanotube and 100 parts by weight of a solvent, and ultrasonic processing for 1.5-3 hrs with an ultrasonic cell disrupter at 300 w-600 w to obtain a mixture;

b) adding 0.01-5 parts by weight of a polymer thickener to the mixture from step a) followed by ultrasonic processing for 1-2 hrs with an ultrasonic cell disrupter at 300 w-600 w to obtain another mixture;

c) forming a coating of 100-300 nm on pre-oxidized fibre with the mixture obtained from step b), followed by carbonizing, to obtain the high-strength carbon fibre.

The carbon nanotube used in step a) is a carboxylated multi-walled carbon nanotube.

The solvent used in step b) is selected from the group consisting of dimethyl sulfoxide, N,N-dimethylformamide, dimethylacetamide, and distilled water.

The polymer thickener used in step b) is selected from the group consisting of polyacrylonitrile, polyvinyl alcohol, and $\alpha$-cyanoacrylate. The thickener is selected depending on the solvent used.

The coating in step c) is formed by immersing the pre-oxidized fibre in the mixture obtained from step b) in a solid-to-liquid ratio of 1:3-1:2 and standing for 1-2 hrs.

The coating in step c) is formed by electrostatic spraying the mixture obtained from step b) onto the surface of the fibre with a voltage of 80 kv-120 kv, a spray distance of 25 cm-40 cm, and a rotation speed of spray gun of 2800 r/min-3000 r/min.

The advantages of this embodiment are as follows:

(1) The defects on the surface of fibres are decreased by repairing the surface, and therefore stress concentration can be effectively eliminated, resulting in an increase of 15%-30% and 30% in tensile strength and toughness of carbon fibre, respectively;

(2) The process time is short, and the process can be used in combination with the online equipment, therefore investment on equipments and the cost for process are low;

(3) The ratio of carbon nanotube to solvent and the winding speed can be adjusted depending on the degree of defect of carbon fibres to obtain a better strengthening effect;

(4) The process effect is good and yield is high;

(5) It is easily to handle and readily to be industrialized.

In an embodiment, the present invention provides a process for producing a PAN based carbon fibre, comprising the following steps:

a) mixing PAN and a solvent in a solid-to-liquid ratio of 0.1%-25% in a reactor, and heating and stirring the resulting mixture until the PAN is dissolved completely to obtain a solution;

b) adding a catalyst $KMnO_4$ in an amount of 0.05 wt. %-0.1 wt. % based on the weight of the PAN to the solution from step a), followed by bubbling an oxygen-containing gas at 5 ml/min to obtain a spinning solution, then pre-oxidizing the spinning solution for 1-2.5 hrs at 90° C.-250° C.;

c) spinning the spinning solution through a spinning machine, followed by washing with water, drawing and thermosetting to obtain a pre-oxidized fibre with good pre-oxidization degree, which is subjected to a carbonization process to obtain a high-performance carbon fibre.

The solvent used in step a) is selected from the group consisting of 1-butyl-3-methylimidazolium chloride, 1-allyl-3-methylimidazolium chloride, dimethylformamide (DMF), dimethylacetamide (DMAc), dimethylsulfoxide (DMSO), sodium thiocyanate (NaSCN), nitric acid ($HNO_3$), and Zinc chloride ($ZnCl_2$).

The catalyst used in step b) is one or more selected from the group consisting of potassium permanganate ($KMnO_4$), cobalt dichloride ($CoCl_2$), cobalt sulphate ($CoSO_4$), benzoyl peroxide (BPO), succinic acid, hydrogen peroxide ($H_2O_2$), ammonia, and low molecular weight amine.

The time required for pre-oxidization is shortened and the final properties of carbon fibre are improved by using $KMnO_4$ as a catalyst. $CoCl_2$ and $CoSO_4$ can also be used to catalytically improve the structure and properties of PAN. BPO and Succinic acid can also be used as a catalyst for cyclization during pre-oxidization of PAN. The catalyst mentioned above may be used either alone or in combination to reduce the activation energy of oxidization, slow heat release, shorten the time for pre-oxidization and lower the temperature for pre-oxidization, thereby improving the mechanical properties of carbon fibre.

The oxygen-containing gas used in step b) is oxygen or air.

After oxidization of step b), the structure and properties of oxidized product is characterized by Fourier Transform Infrared Spectroscopy (FTIR), thermogravimetry (TG), differential scanning calorimetry (DSC) and NMR, for better determination of the property of the spinning solution.

The structure and properties of the pre-oxidized fibre from step c) is related to the selection of temperature and time for pre-oxidization. Temperature for pre-oxidization of 60° C.-160° C. and time for pre-oxidization of 1 hr-1.5 hrs are conditions for relatively low pre-oxidization degree, and the fibre obtained can be used in civil application.

Temperature for pre-oxidization of 165° C.-250° C. and time for pre-oxidization of 1.5 hrs--2 hrs are conditions for relatively high pre-oxidization degree, and the fibre obtained can be used in industrial application.

The spinning process used in step c) is wet spinning, dry-wet spinning, gel spinning, liquid crystal spinning or jelly spinning.

The tensile strength of carbon fibres obtained according to this embodiment is 4.0-4.6 Gpa.

The advantages of this embodiment are as follows:

(1) Fibres can be uniformly oxidized and the skin-core structure is reduced.

Oxygen is uniformly diffused from surface to inside of fibre in the reactor with stirring. The colour gets deeper as the pre-oxidization proceeds, and the pre-oxidization degree in fibre is uniform, which is different from the prior art wherein non-uniformly oxidization is occurred and skin-core structure is caused.

(2) Energy consumption and therefore the cost are reduced.

The pre-oxidization can be carried out in a reactor. When the temperature of pre-oxidization is 160° C.-220° C., a good pre-oxidization can be reached in a pre-oxidization time of 2 hrs. In addition, pre-oxidization can be fully completed with stirring. Compared with the conventional pre-oxidization process, energy consumption is reduced and so does the cost of pre-oxidization, and therefore cost of carbon fibres is reduced.

(3) Controllable pre-oxidization of PAN is realized.

The oxidization is strictly controlled by controlling reaction conditions, i.e. controllable pre-oxidization of PAN is realized by controlling the time, temperature and catalyst content used for oxidization, thereby improving pre-oxidization degree and reducing side reaction such as cross-linking.

(4) The devices for process are simple.

The pre-oxidization is carried out in a reactor, which is beneficial for realization of a controllable and sufficiently completed pre-oxidization, so that expensive and complicated devices of prior art are avoided.

By modification on the prior carbon fibres producing line, the complicated process of pre-oxidization is simplified. The pre-oxidization can be carried directly in a reactor, and spinning is carried. The skin-core structure of carbon fibre obtained according to the present process is reduced, which improves the tensile strength of fibres from 3.3-3.5 GPa to 4.0-4.6 GPa and has an advantage of lower cost compared with the high strength carbon fibres commercial available at present.

BRIEF DESCRIPTION OF THE DRAWING

The present invention will be further described in details in connection with certain preferred embodiments with reference to the accompanying drawings, in which

FIG. 5-1 shows a SEM photograph of the cross-section of PAN fibre obtained when PAN/[BMIM]Cl is 1:1 after washed with water;

FIG. 5-2 shows another SEM photograph of the cross-section of PAN fibre obtained when PAN//[BMIM]Cl is 1:1 after washed with water;

FIG. 7-1 shows a SEM photograph of the cross-section of PAN fibre obtained when PAN/[BMIM]Cl is 1.2:1 after washed with water;

FIG. 7-2 shows another SEM photograph of the cross-section of PAN fibre obtained when PAN/[BMIM]Cl is 1.2:1 after washed with water;

FIG. 19-1 is a flow diagram showing a process of producing PAN based carbon fibres in prior art;

FIG. 19-2 is a flow diagram showing an improved process of producing PAN based carbon fibres;

FIG. 20-1 shows the infrared spectra of PAN/IL pre-oxidized at 170° C. for different times, 1: not pre-oxidized; 2: 20 min; 3: 40 min; 4: 60 min; 5: 90 min;

FIG. 20-2 shows the infrared spectra of PAN/IL pre-oxidized at 160° C. for different times, 1: 20 min; 2: 40 min; 3: 60 min; 4: 90 min; 5: 120 min; 6:150 min;

EXAMPLES

For a better understanding of embodiments of the present invention, together with the technical means, the characteristics and the purposes as well as effects thereof, reference is made to the following embodiments.

Example 1

Figure 1:
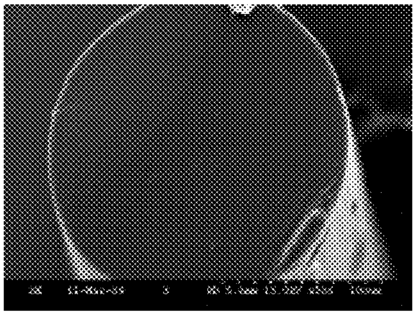
FIG. 1 shows a SEM photograph of the cross-section of carbon fibre precursor based precursor fibre spun from a spinning solution containing 2 wt. % gelling agent based on the total weight of the solution.

First, 5 g anhydrous PAN powder and 95 g DMSO solvent are uniformly mixed in a three-neck flask, while heated in an oil bath maintained at a temperature of 70° C., and stirred to completely dissolve PAN powder. After the PAN powder is dissolved, 2 g distilled water is added. Upon mechanical stirred for one hour, the slurry is transferred to a spinning machine for spinning, and the PAN based precursor fibre obtained by the gel spinning (in which the spinning temperature is 60° C., the coagulation bath temperature is 10-20° C., the primary washing temperature is 75° C., the secondary temperature is 100° C.) has a tensile strength of 4.31 GPa. FIG. 1 shows a SEM photograph (magnification factor of which is 15,000) of PAN based precursor fibre spun from a spinning solution containing 2 wt. % gelling agent based on the total weight of the solution. It can be seen from FIG. 1 that the cross-section of the obtained PAN based precursor fibre is circle nearly without voids across the section and the precursor fibre is structural compact. Therefore, the tensile strength of the PAN based precursor fibre for carbon fibre is substantially increased.

Example 2

Figure 2:
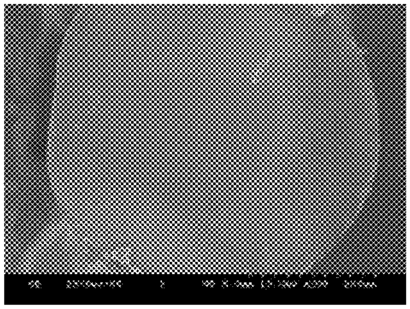
FIG. 2 shows a SEM photograph of the cross-section of carbon fibre precursor based precursor fibre spun from a spinning solution containing 3 wt. % gelling agent based on the total weight of the solution.

First, 10 g anhydrous PAN powder and 90 g DMF solvent are uniformly mixed in a three-neck flask, while heated in an oil bath maintained at a temperature of 90° C., and stirred to completely dissolve the PAN powder. After the PAN powder is dissolved, 3 g ethylene glycol is added. Upon mechanical stirred for one hour, the slurry is transferred to a spinning machine for spinning, and the PAN based precursor fibre obtained by the gel spinning (the spinning condition is the same as those in example 1) has a tensile strength of 4.4 GPa. FIG. 2 shows a SEM photograph (magnification factor of which is 15,000) of PAN based precursor fibre spun from a spinning solution containing 3 wt. % gelling agent based on the total weight of the solution. It can be seen from FIG. 2 that the cross-section of the obtained PAN based precursor fibre is circle nearly without voids across the section, and the precursor fibre is structural compact and skin-core structure is not observed.

Example 3

Figure 3:
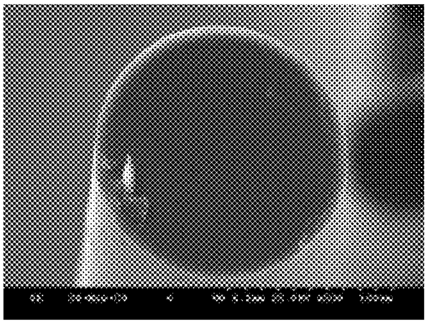
FIG. 3 shows a SEM photograph of the cross-section of carbon fibre precursor based precursor fibre spun from a spinning solution containing 4 wt. % gelling agent based on the total weight of the solution.

First, 10 g anhydrous PAN powder and 90 g DMAc solvent are uniformly mixed in a three-neck flask, while heated in a sand bath maintained at a temperature of 90° C., and stirred to completely dissolve the PAN powder. After the PAN powder is dissolved, 4 g ethylene glycol is added. Upon mechanical stirred for one hour, the slurry is transferred to a spinning machine for spinning, and the PAN based precursor fibre obtained by the gel spinning (the spinning condition is the same as those in example 1) has a tensile strength of 4.2 GPa. FIG. 3 shows a SEM photograph (magnification factor of which is 25,000) of PAN based precursor fibre spun from a spinning solution containing 4 wt. % gelling agent based on the total weight of the solution. It can be seen from FIG. 3 that the cross-section of the obtained PAN based precursor fibre is circle nearly without voids across the section and the precursor fibre is structural compact.

Example 4

Figure 4:
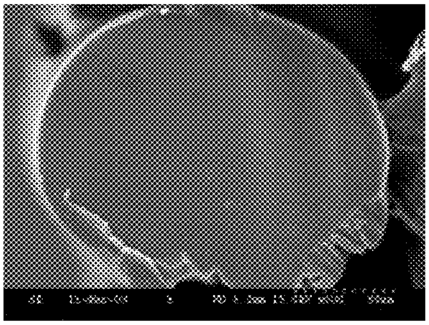
FIG. 4 shows a SEM photograph of the cross-section of carbon fibre precursor based precursor fibre spun from a spinning solution containing 5 wt. % gelling agent based on the total weight of the solution.

First, 5 g anhydrous PAN powder and 95 g NaSCN solvent are uniformly mixed in a three-neck flask, while heated in an oil bath maintained at a temperature of 100° C., and stirred to completely dissolve the PAN powder. After the PAN powder is dissolved, 5 g urea is added. Upon mechanical stirred for one hour, the slurry is transferred to a spinning machine for spinning, and the PAN based precursor fibre obtained by the gel spinning (the spinning condition is the same as those in example 1) has a tensile strength of 4.5 GPa. FIG. 4 shows a SEM photograph (magnification factor of which being 15,000) of PAN based precursor fibre spun from a spinning solution containing 5 wt. % gelling agent based on the total weight of the solution. It can be seen from FIG. 4 that the cross-section of the obtained PAN based precursor fibre is uniform nearly without skin-core structure and voids, and the precursor fibre is structural compact. Therefore, the tensile strength of the PAN based precursor fibre for carbon fibre is substantially increased.

Example 5

First, 5 g anhydrous PAN powder and 95 g $ZnCl_2$ solvent are uniformly mixed in a three-neck flask, while heated in an oil bath maintained at a temperature of 100° C., and stirred to completely dissolve the PAN powder. After the PAN powder is dissolved, 2 g thiourea is added. Upon mechanical stirred for one hour, the slurry is transferred to a spinning machine for spinning, and the PAN based precursor fibre obtained by the gel spinning (the spinning condition is the same as those in example 1) has a tensile strength of 4.51 GPa.

Example 6

First, PAN powder and [BMIM]BF4 are uniformly mixed in a mass ratio of 1:1 in a high speed mixer. Then the mixture is transferred to a twin-screw spinning machine for melt spinning (in which screw speed is 50 r/min, the temperatures for feeding section, plasticizing section and melting section are set at 185° C., 190° C. and 185° C., respectively, the aspect ratio of the spinneret is 1:3 and the orifices in the spinneret is 0.5 mm in diameter). The spun fibre is subjected to a primary dry-heat drawing, a secondary dry-heat drawing, washing with water, oiling and thermosetting (in which the drawing ratio is 2-10 times, the drawing temperature is 90° C.-120° C. and the washing temperature is 25° C.-40° C.) to give PAN fibre. The obtained PAN fibre has a tensile strength of 2.8 cN/dtex and an elongation at break of 19.0%.

Example 7

First, PAN powder and [BMIM]BF4 are uniformly mixed in a mass ratio of 1.2:1 in a high speed mixer. Then the mixture is transferred to a twin-screw spinning machine for melt spinning in which the screw speed is adjusted to 75 r/min, the temperatures for feeding section, plasticizing section and melting section are set at 180° C., 185° C. and 180° C., respectively, the aspect ratio of the spinneret is 1:3 and the orifices in the spinneret is 0.5 mm in diameter. The spun fibre is subjected to a primary dry-heat drawing, a secondary dry-heat drawing, washing with water, oiling and thermosetting to give PAN fibre. The obtained PAN fibre has a tensile strength of 3.6 cN/dtex and an elongation at break of 8.9%.

Example 8

Figures 1, 5:
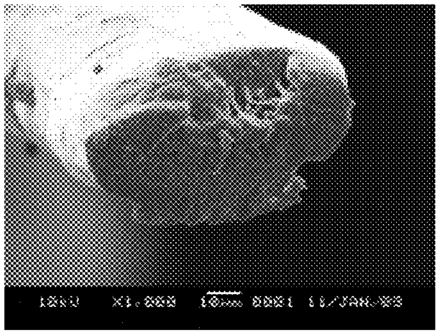
Figures 2, 5:
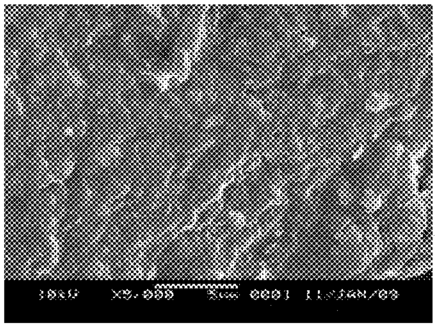
Figure 6:
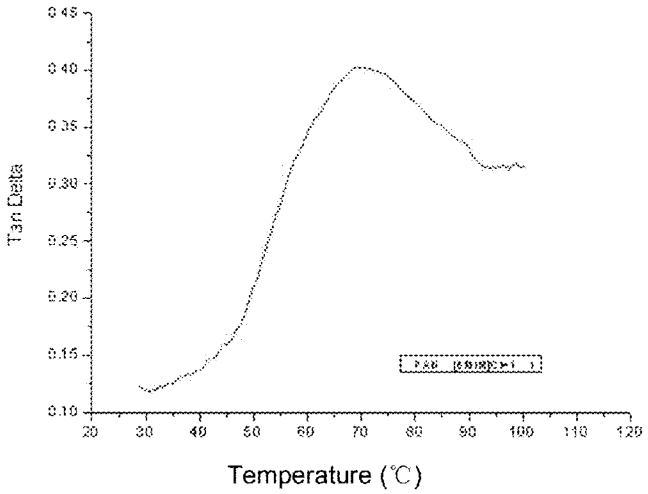
FIG. 6 is a DMA curve diagram of the PAN fibre obtained when PAN/[BMIM]Cl is 1:1.

First, PAN powder and [BMIM]BF4 are uniformly mixed in a mass ratio of 1:1 in a high speed mixer. Then the mixture is transferred to a twin-screw spinning machine for melt spinning in which the screw speed is adjusted to 70 r/min, the temperatures for feeding section, plasticizing section and melting section are set at 185° C., 190° C. and 190° C., respectively, the aspect ratio of the spinneret is 1:3 and the orifices in the spinneret is 0.5 mm in diameter. The spun fibre is subjected to a primary dry-heat drawing, a secondary dry-heat drawing, washing with water, oiling and thermosetting to give PAN fibres. The obtained PAN fibre has a tensile strength of 4.0 cN/dtex and an elongation at break of 16.9%. FIG. 5 shows a SEM photograph of the cross-section of PAN fibre after washed with water. It can be concluded from the SEM photograph that the cross section of the fibre is circle without skin-core structure. FIG. 6 is the DMA curve diagram of the PAN fibre obtained with PAN/[BMIM]Cl of 1:1. It can be deduced from FIG. 6 that the glass transition temperature of PAN is decreased upon the addition of plasticizer and it is beneficial to drawing of macromolecule chain.

Example 9

Figures 1, 7:
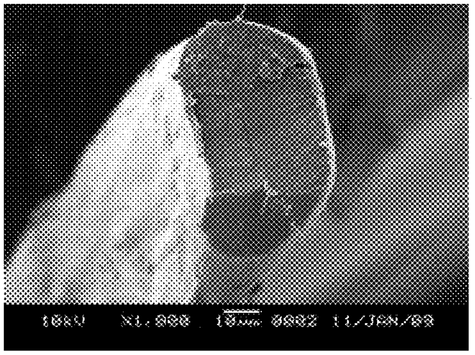
Figures 2, 7:
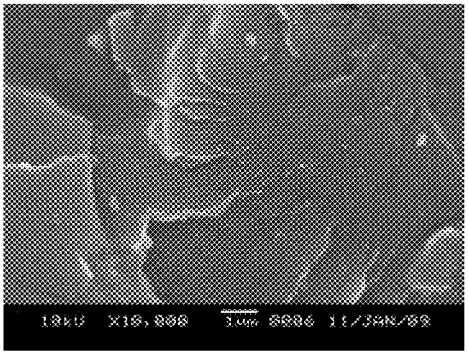
Figure 8:
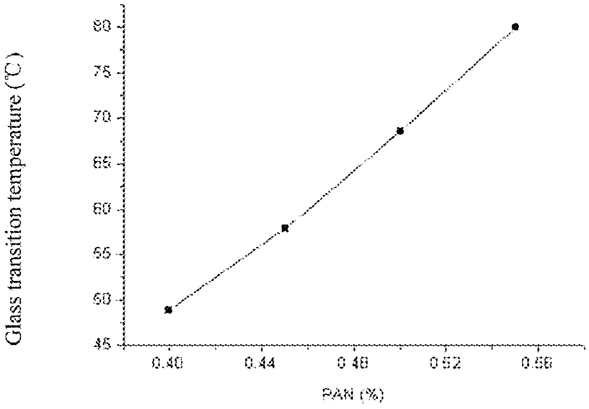
FIG. 8 is a curve diagram illustrating the relationship between Tg and PAN content of the fibres obtained from PAN/[BMIM]Cl system before washed with water.

First, PAN powder and [BMIM]Cl are uniformly mixed in a mass ratio of 1.2:1 in a high speed mixer. Then the mixture is transferred to a twin-screw spinning machine for melt spinning in which the screw speed is adjusted to 60 r/min, the temperatures for feeding section, plasticizing section and melting section are set at 180° C., 185° C. and 185° C., respectively, the aspect ratio of the spinneret is 1:3 and the orifices in the spinneret is 0.5 mm in diameter. The spun fibre is subjected to a primary dry-heat drawing, a secondary dry-heat drawing, washing with water, oiling and thermosetting to give PAN fibres. The obtained PAN fibre has a tensile strength of 4.0 cN/dtex and an elongation at break of 14.3%. FIG. 7 shows a SEM photograph of the cross-section of PAN fibre after washed with water. It can be seen from the SEM photograph that the cross section of the fibre is nearly circle and the core is relatively structural compact resulting in the PAN based precursor fibre with relatively excellent physical and mechanical properties. FIG. 8 is a curve diagram illustrating the relationship between Tg and PAN content of the fibres obtained from PAN/[BMIM]Cl system before washed with water. It can be deduced from FIG. 8 that the glass transition temperature of PAN decreases with the decrease of the PAN content, i.e. [BMIM]Cl functions as a plasticizer during the melt spinning, the higher the [BMIM]Cl content, the lower the glass transition of the melt, and the more beneficial to drawing of the fibre during subsequent procedure.

Example 10

First, Cobalt dichloride, a catalyst of PAN pre-oxidization is dissolved in an ionic liquid (1-butyl-3methyl-imidazolium chloride) in a weight ratio of 1:100. Then anhydrous PAN powder is added with the weight ratio of PAN powder to ionic liquid being 1:1. The obtained mixture is feed into a twin-screw spinning machine for melt spinning while blowing air through the melting section of the twin-screw spinning machine, wherein the air flow is 1 ml/min, the screw speed is 40 r/min, the temperatures for the feeding section, plasticizing section and melting section are 170° C., 185° C. and 185° C., respectively, the aspect ratio of the spinneret is 1:3 and the orifices in the spinneret is 0.5 mm in diameter. The spun fibre is directly subjected to dry-heat drawing (wherein the drawing temperature is 110° C., the total drawing ratio is 4 times). The drawn fibre is washed with water at 70° C., followed by thermoset in dry and hot air at 150° C. to give PAN pre-oxidization fibre with a pre-oxidization degree of 31%.

Example 11

First, cobalt sulphate, a catalyst of PAN pre-oxidization is dissolved in an ionic liquid (1-butyl-3-methyl imidazolium tetrafluoroborate) in a weight ratio of 0.01:100. Then anhydrous PAN powder is added with the weight ratio of PAN powder to ionic liquid being 1:1. The obtained mixture is feed into a twin-screw spinning machine for melt spinning while blowing oxygen through the melting section of the twin-screw spinning machine, wherein the oxygen flow is 5 ml/min, the screw speed is 120 r/min, the temperatures for the feeding section, plasticizing section and melting section are 185° C., 220° C. and 220° C., respectively, the aspect ratio of the spinneret is 1:3 and the orifices in the spinneret is 0.5 mm in diameter. The spun fibre is directly subjected to dry-heat drawing (wherein the drawing temperature is 140° C., the total drawing ratio is 6 times). The drawn fibre is washed with water at 90° C., followed by thermoset in dry and hot air at 150° C. to give PAN pre-oxidization fibre with a pre-oxidization degree of 31%.

Example 12

Figure 9:
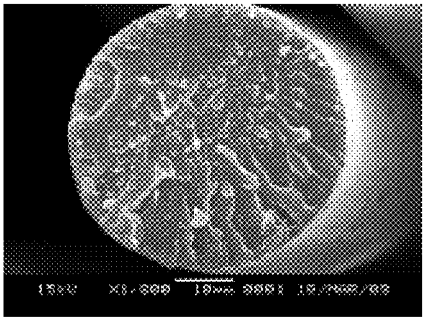
FIG. 9 shows a SEM photograph of the cross section of the fibre obtained when PAN/[BMIM]Cl is 1:1 and $KMnO_4$/[BMIM]Cl is 0.01:100 after washed with water.

First, potassium permanganate particles and [BMIM]Cl are uniformly mixed in a three-neck flask in a weight ratio of 0.01:100. After the potassium permanganate is completely dissolved, the dried PAN powder and [BMIM]Cl are uniformly mixed in a high speed mixer in a weight ratio of 1:1, followed by transferred to a twin-screw spinning machine for melt spinning while blowing oxygen through the melting section of the twin-screw spinning machine, wherein the oxygen flow is 2 ml/min, the screw speed is 50 r/min, the temperatures for the feeding section, plasticizing section and melting section are 185° C., 190° C. and 185° C., respectively, the aspect ratio of the spinneret is 1:3 and the orifices in the spinneret is 0.5 mm in diameter. The spun fibre is subjected to dry-heat drawing (wherein the drawing temperature is 120° C., the total drawing ratio is 45 times). The drawn fibre is washed with water at 80° C., followed by thermoset in dry and hot air at 120-150° C. to give PAN pre-oxidization fibre with a pre-oxidization degree of 31%. FIG. 9 shows a SEM photograph of the cross section of the fibre obtained when PAN/[BMIM]Cl is 1:1 and KMnO4/[BMIM]Cl is 0.01:100 after washed with water. It can be seen from FIG. 9 that the cross section of the pre-oxidized fibre is very compact in structure and nearly circle in shape, and that there is nearly no voids in the core, the density is increased and the pre-oxidized fibre has relatively excellent physical and mechanical properties.

Example 13

Figure 10:
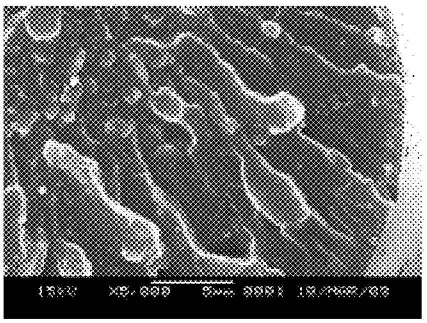
FIG. 10 shows a SEM photograph of the cross section of the fibre obtained when PAN/[BMIM]Cl is 1:1 and $KMnO_4$/[BMIM]Cl is 0.1:100 after washed with water.
Figure 13:
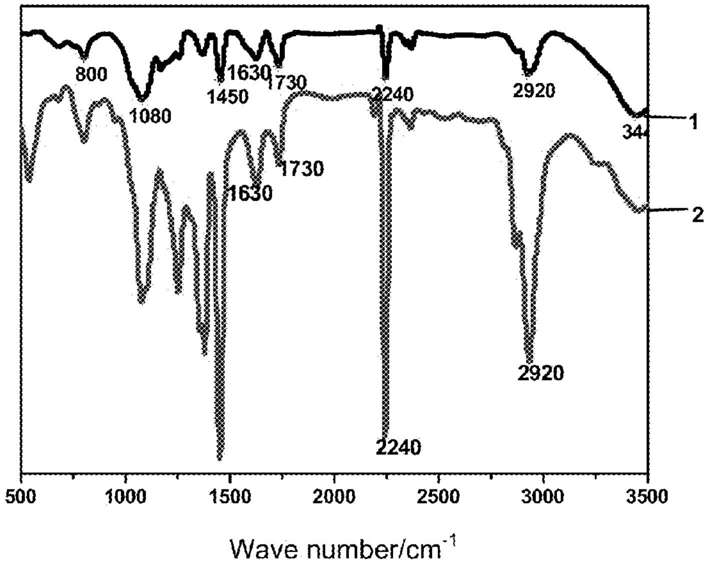
FIG. 13 shows the infrared spectra of fibres obtained when PAN/[BMIM]Cl is 1:1 and $KMnO_4$/[BMIM]Cl is 0.1:100.

First, potassium permanganate particles and [BMIM]Cl are uniformly mixed in a three-neck flask in a weight ratio of 0.1:100. After the potassium permanganate is completely dissolved, the dried PAN powder and [BMIM]Cl are uniformly mixed in a high speed mixer in a weight ratio of 1:1, followed by transferred to a twin-screw spinning machine for melt spinning while blowing oxygen through the melting section of the twin-screw spinning machine, wherein the oxygen flow is 2 ml/min, the screw speed is 50 r/min, the temperatures for the feeding section, plasticizing section and melting section are 185° C., 190° C. and 185° C., respectively, the aspect ratio of the spinneret is 1:3 and the orifices in the spinneret is 0.5 mm in diameter. The spun fibre is subjected to dry-heat drawing (wherein the drawing temperature is 120° C., the total drawing ratio is 45 times). The drawn fibres is washed with water at 80° C., followed by thermoset in dry and hot air at 150° C. to give PAN pre-oxidization fibre with a pre-oxidization degree of 67%. FIG. 10 shows a SEM photograph of part of the cross section of the fibre obtained when PAN/[BMIM]Cl is 1:1 and KMnO4/[BMIM]Cl is 0.1:100 after washed with water. FIG. 13 shows the infrared spectra of fibres obtained when PAN/[BMIM]Cl is 1:1 and KMnO4/[BMIM]Cl is 0.1:100, wherein curve 1 is for pre-oxidized fibre and curve 2 is for precursor fibre. It can be concluded from FIG. 13 that the absorption peak of cyano group (2240 cm-1) upon oxidization decreases while the absorption peak of —C═N (1630 cm-1) increases, indicating that part of cyano groups are converted to —C═N upon pre-oxidization, facilitating the formation of intramolecular ring. It can be seen from FIG. 10 that the cross section of the pre-oxidized fibre is very compact in structure and there is no skin-core structure and no voids, the pre-oxidized fibre is structural uniform from surface to inside, and without skin-core structure as obtained by wet spinning.

Example 14

Figure 11:
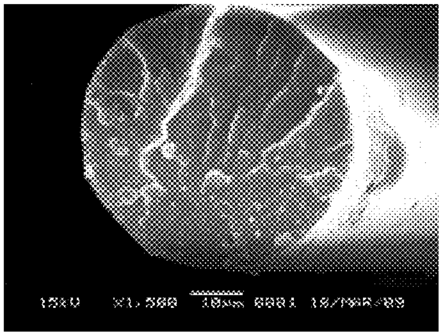
FIG. 11 shows a SEM photograph of the cross section of the fibre obtained when PAN/[BMIM]Cl is 1:1 and BPO/[BMIM]Cl is 0.01:100 after washed with water.

First, benzoyl peroxide and [BMIM]Cl are uniformly mixed in a three-neck flask in a weight ratio of 0.01:100. After the benzoyl peroxide is completely dissolved, the dried PAN powder and [BMIM]Cl are uniformly mixed in a high speed mixer in a weight ratio of 1:1, followed by transferred to a twin-screw spinning machine for melt spinning while blowing oxygen through the melting section of the twin-screw spinning machine, wherein the oxygen flow is 2 ml/min, the screw speed is 50 r/min, the temperatures for the feeding section, plasticizing section and melting section are 185° C., 190° C. and 185° C., respectively, the aspect ratio of the spinneret is 1:3 and the orifices in the spinneret is 0.5 mm in diameter. The spun fibre is subjected to dry-heat drawing (wherein the drawing temperature is 120° C., the total drawing ratio is 45 times). The drawn fibres is washed with water at 80° C., followed by thermoset in dry and hot air at 150° C. to give PAN pre-oxidization fibre with a pre-oxidization degree of 47%. FIG. 11 shows a SEM photograph of the cross section of the fibre obtained when PAN/[BMIM]Cl is 1:1 and BPO/[BMIM]Cl is 0.01:100 after washed with water. It can be seen from FIG. 11 that the cross section of the pre-oxidized fibre is nearly circle in shape and is relatively compact in core and, and the pre-oxidized fibre has relatively excellent physical and mechanical properties.

Example 15

Figure 12:
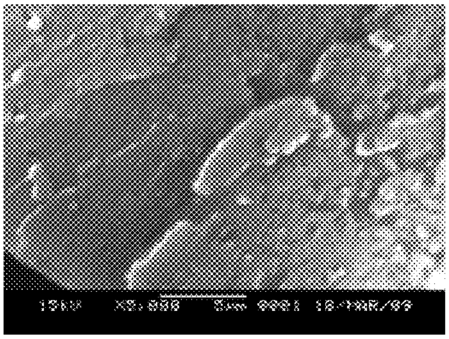
FIG. 12 shows a SEM photograph of the cross section of the fibre obtained when PAN/[BMIM]Cl is 1:1 and BPO/[BMIM]Cl is 0.1:100 after washed with water.
Figure 14:
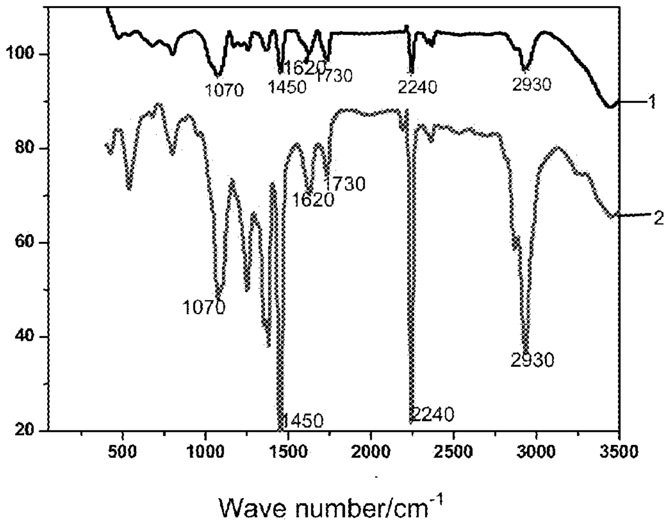
FIG. 14 shows the infrared spectra of fibres obtained when PAN/[BMIM]Cl is 1:1 and BPO/[BMIM]Cl is 0.1:100.

First, benzoyl peroxide and [BMIM]Cl are uniformly mixed in a three-neck flask in a weight ratio of 0.1:100. After the benzoyl peroxide is completely dissolved, the dried PAN powder and [BMIM]Cl are uniformly mixed in a high speed mixer in a weight ratio of 1:1, followed by transferred to a twin-screw spinning machine for melt spinning while blowing oxygen through the melting section of the twin-screw spinning machine, wherein the oxygen flow is 2 ml/min, the screw speed is 50 r/min, the temperatures for the feeding section, plasticizing section and melting section are 185° C., 190° C. and 185° C., respectively, the aspect ratio of the spinneret is 1:3 and the orifices in the spinneret is 0.5 mm in diameter. The spun fibre is subjected to dry-heat drawing (wherein the drawing temperature is 120° C., the total drawing ratio is 45 times). The drawn fibres is washed with water at 80° C., followed by thermoset in dry and hot air at 150° C. to give PAN pre-oxidization fibre with a pre-oxidization degree of 73%. FIG. 12 shows a SEM photograph of part of the cross section of the fibre obtained when PAN/[BMIM]Cl is 1:1 and BPO/[BMIM]Cl is 0.1:100 after washed with water. It can be seen from FIG. 12 that the cross section of the pre-oxidized fibre is very compact in structure and there is no skin-core structure and no voids, the pre-oxidized fibre is structural uniform from surface to inside, and without skin-core structure as obtained by wet spinning FIG. 14 shows infrared spectra of fibres obtained when PAN/[BMIM]Cl is 1:1 and BPO/[BMIM]Cl is 0.1:100, wherein curve 1 is for pre-oxidized fibre and curve 2 is for precursor fibre. It can be concluded from FIG. 14 that the absorption peak of cyano group (2240 cm-1) upon oxidization decreases while the absorption peak of —C═N (1630 cm-1) increases, indicating that part of cyano groups are converted to —C═N upon pre-oxidization, facilitating the formation of intramolecular ring.

Examples 16-20

Examples 16-20 are performed as Example 15 except that using different catalyst for PAN pre-oxidization and ionic liquids, as listed in the following table 1.

TABLE 1

The catalyst for PAN pre-oxidization and ionic liquids as well as the pre-oxidization degree of the obtained fibres

| No. | Catalyst for PAN preoxidization | Ionic liquid | Pre-oxidization degree (%) |
|---|---|---|---|
| Example 16 | K2S2O8 | [EMIM]Cl | 50 |
| Example 17 | Succinic acid | [BMIM]Br | 63 |
| Example 18 | Hydrogen peroxide | [EMIM]BF4 | 82 |
| Example 19 | Ammonia | [EMIM]BF6 | 68 |
| Example 20 | Hydroxylamine hydrochloride | [BMIM]BF4 | 79 |

Example 21

Figure 15:
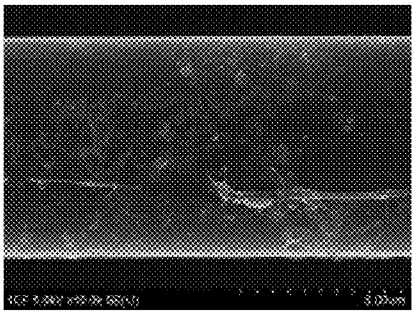
FIG. 15 shows a filed emission SEM photograph at 10000× magnification for carbon fibres treated with polyacrylonitrile:multi-walled carbon nanotube:dimethylsulfoxide=0.05:0.5:100 by weight.

0.05 parts by weight of carboxylated multi-walled carbon nanotube (available from Chengdu Institute of Organic Chemistry of Chinese Academy of Sciences, with length of 10-30 μm, inner diameter of 10-20 nm, outer diameter of 5-10 nm) and 100 parts by weight of dimethylsulfoxide solvent are mixed, ultrasonic processed for 3 hrs in an ultrasonic cell disrupter operating at 300 w; to the resulting solution is added 0.05 parts by weight of polymer thickener PAN (with polymerization degree of 88,000 and particle size of 230 nm-250 nm) and ultrasonic processed for 2 hrs in an ultrasonic cell disrupter operating at 300 w. The oxidized PAN pre-oxidized fibre is dipped into the obtained solution in a solid-to-liquid ratio of 1:3 for 1 hr, and a coating of 200 nm is formed on the surface of the oxidized PAN pre-oxidized fibre. The oxidized PAN pre-oxidized fibre is carbonized at 1000° C. to give high strength carbon fibre. FIG. 15 shows a filed emission SEM photograph (magnification factor of which is 10,000) of carbon fibres treated with PAN:multi-walled carbon nanotube:dimethylsulfoxide=0.05:0.05:100 by weight. It can be seen from FIG. 15 that carbon nanotubes are uniformly attached to the surface of fibres and can repair voids on the surface of fibre so that the tensile strength of carbon fibre can be effectively increased.

Example 22

Figure 16:
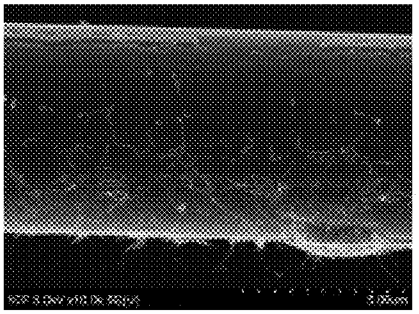
FIG. 16 shows a filed emission SEM photograph at 10000× magnification for carbon fibres treated with polyvinyl alcohol:multi-walled carbon nanotube:N,N-dimethylformamide=0.05:0.5:100 by weight.

0.5 parts by weight of carboxylated multi-walled carbon nanotube (available from Chengdu Institute of Organic Chemistry of Chinese Academy of Sciences, with length of 10-30 μm, inner diameter of 10-20 nm, outer diameter of 5-10 nm) and 100 parts by weight of N,N-dimethylformamide solvent are mixed, ultrasonic processed for 1.5 hrs in an ultrasonic cell disrupter operating at 600 w. To the resulting solution is added 0.05 parts by weight of polymer thickener polyvinyl alcohol (with polymerization degree of 88,000 and particle size of 230 nm-250 nm) and ultrasonic processed for 1 hrs in an ultrasonic cell disrupter operating at 600 w. The oxidized PAN pre-oxidized fibre is dipped into the obtained solution in a solid-to-liquid ratio of 1:2 for 2 hrs; a coating of 200 nm is formed on the surface of the oxidized PAN pre-oxidized fibre. The oxidized PAN pre-oxidized fibre is carbonized at 1000° C. to give high strength carbon fibre. FIG. 16 shows a filed emission SEM photograph (magnification factor of which is 10,000) of carbon fibres treated with polyvinyl alcohol:multi-walled carbon nanotube:N,N-dimethylformamide=0.05:0.5:100 by weight. It can be seen from FIG. 16 that multi-walled carbon nanotubes are uniformly attached to the surface of carbon fibre and repair voids on the surface of carbon fibre, which is beneficial to increase of the tensile strength of carbon fibres.

Example 23

Figure 17:
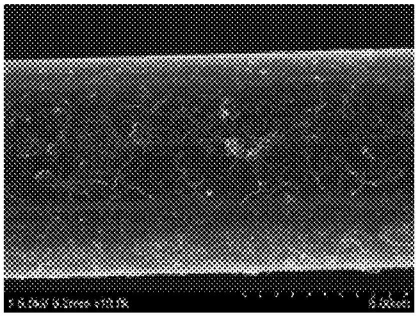
FIG. 17 shows a filed emission SEM photograph at 10000× magnification for carbon fibres treated with polyvinyl alcohol:multi-walled carbon nanotube:water=5:0.05:100 by weight.

0.05 parts by weight of carboxylated multi-walled carbon nanotube (available from Chengdu Institute of Organic Chemistry of Chinese Academy of Sciences, with length of 10-30 μm, inner diameter of 10-20 nm, outer diameter of 5-10 nm) and 100 parts by weight of water solvent are mixed, ultrasonic processed for 2 hrs in an ultrasonic cell disrupter operating at 500 w. To the resulting solution is added 5 parts by weight of polymer thickener polyvinyl alcohol (with polymerization degree of 88,000 and particle size of 230 nm-250 nm) and ultrasonic processed for 1.5 hrs in an ultrasonic cell disrupter operating at 600 w. The obtained solution is electrostatically sprayed onto the surface of the oxidized PAN pre-oxidized fibre with a voltage of 80 kv, a spray distance of 25 cm and a rotation speed of spray gun of 2800 r/min to form a coating of 300 nm thereon. The oxidized PAN pre-oxidized fibre is carbonized at 1000° C. to give high strength carbon fibre. FIG. 17 shows a filed emission SEM photograph (magnification factor of which is 10,000) of carbon fibres treated with polyvinyl alcohol:multi-walled carbon nanotube:water=5:0.05:100 by weight.

Example 24

Figure 18:
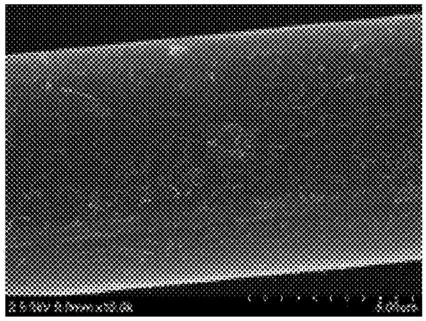
FIG. 18 shows a filed emission SEM photograph at 10000× magnification for carbon fibres treated with α-cyanoacrylate:multi-walled carbon nanotube:water=5:0.05:100 by weight.

0.05 parts by weight of carboxylated multi-walled carbon nanotube (available from Chengdu Institute of Organic Chemistry of Chinese Academy of Sciences, with length of 10-30 μm, inner diameter of 10-20 nm, outer diameter of 5-10 nm) and 100 parts by weight of water solvent are mixed, ultrasonic processed for 1.5 hrs in an ultrasonic cell disrupter operating at 500 w. To the resulting solution is added 5 parts by weight of polymer thickener α-cyanoacrylate (with molecular weight of 400-800, available from Shanghai Tailuo Company Ltd.) and ultrasonic processed for 1 hr in an ultrasonic cell disrupter operating at 500 w. The obtained solution is electrostatically sprayed onto the surface of the oxidized PAN pre-oxidized fibre with a voltage of 120 kv, a spray distance of 40 cm and a rotation speed of spray gun of 3000 r/min to form a coating of 100 nm thereon. The oxidized PAN pre-oxidized fibre is carbonized at 1000° C. to give high strength carbon fibre. FIG. 18 shows a filed emission SEM photograph (magnification factor of which is 10,000) of carbon fibres treated with α-cyanoacrylate:multi-walled carbon nanotube:water=5:0.05:100 by weight. It can be seen from FIG. 18 that multi-walled carbon nanotubes are uniformly attached to the surface of carbon fibres and repair voids on the surface of carbon fibres, which is beneficial to increase of the tensile strength of carbon fibre.

Example 25

0.01 parts by weight of carboxylated Multi-walled Carbon nanotube (available from Chengdu Institute of Organic Chemistry of Chinese Academy of Sciences, with length of 10-30 μm, inner diameter of 10-20 nm, outer diameter of 5-10 nm) and 100 parts by weight of water solvent are mixed, ultrasonic processed for 1.5 hrs in an ultrasonic cell disrupter operating at 500 w. To the resulting solution is added 0.01 parts by weight of polymer thickener α-cyanoacrylate and ultrasonic processed for 1 hr in an ultrasonic cell disrupter operating at 500 w. The obtained solution is electrostatically sprayed onto the surface of the oxidized PAN pre-oxidized fibre with a voltage of 100 kv, a spray distance of 30 cm and a rotation speed of spray gun of 2900 r/min to form a coating of 100 nm thereon. The oxidized PAN pre-oxidized fibre is carbonized at 1000° C. to give high strength carbon fibre.

Example 26

2 parts by weight of carboxylated multi-walled carbon nanotube (available from Chengdu Institute of Organic Chemistry of Chinese Academy of Sciences, with length of 10-30 μm, inner diameter of 10-20 nm, and outer diameter of 5-10 nm) and 100 parts by weight of dimethylacetamide solvent are mixed, ultrasonic processed for 1.5 hrs in an ultrasonic cell disrupter operating at 500 w. To the resulting solution is added 2 parts by weight of polymer thickener α-cyanoacrylate and ultrasonic processed for 1 hr in an ultrasonic cell disrupter operating at 500 w. The obtained solution is electrostatically sprayed onto the surface of the oxidized PAN pre-oxidized fibre with a voltage of 120 kv, a spray distance of 30 cm and a rotation speed of spray gun of 2900 r/min to form a coating of 100 nm thereon. The oxidized PAN pre-oxidized fibre is carbonized at 1000° C. to give high strength carbon fibre. The mechanical properties of carbon fibres obtained from Examples 21-26 are shown in table 2.

TABLE 2

| Mechanical properties of carbon fibres obtained | | | | |
|---|---|---|---|---|
| | Mechanical properties | | | |
| | Tensile strength | | Elongation at break | |
| | Strength/GPa | Variation range (%) | Elongation (%) | Variation range % |
| Contrast (untreated) | 3.18 | — | 8.90 | — |
| Example 21 | 3.80 | +22.64 | 13.5 | +51.6 |
| Example 22 | 4.35 | +36.79 | 14.3 | +60.6 |
| Example 23 | 4.40 | +38.36. | 15.0 | +68.5 |
| Example 24 | 4.67 | +46.85 | 16.3 | +83.1 |
| Example 25 | 4.78 | +50.30 | 16.9 | +89.8 |
| Example 26 | 4.71 | +48.11 | 16.0 | +79.7 |

Example 27

Figures 1, 19:
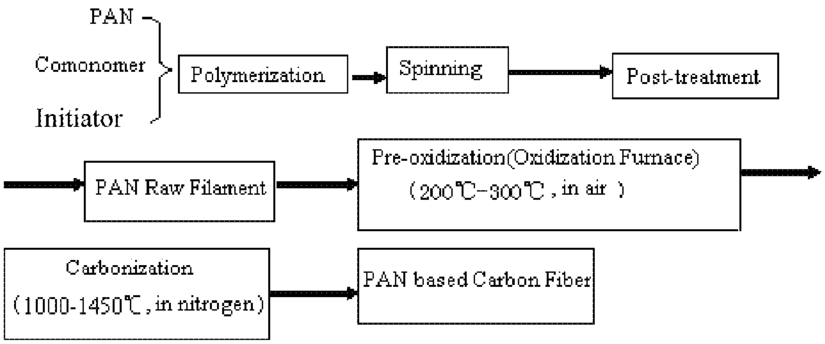
Figures 2, 19:
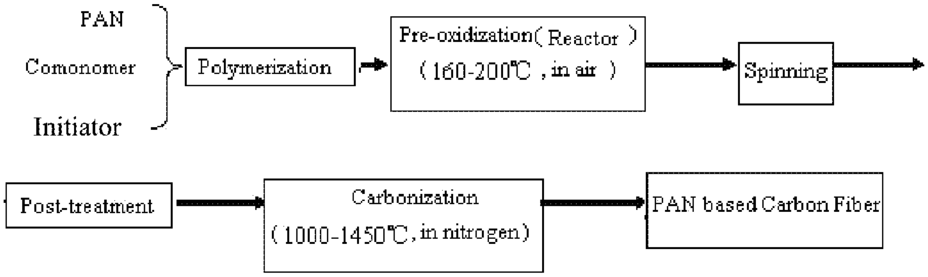
Figures 1, 20:
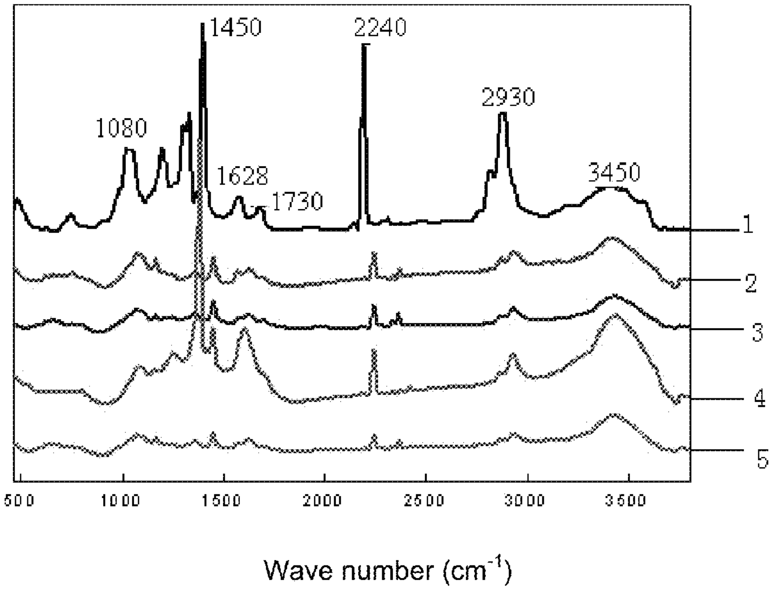
Figures 2, 20:
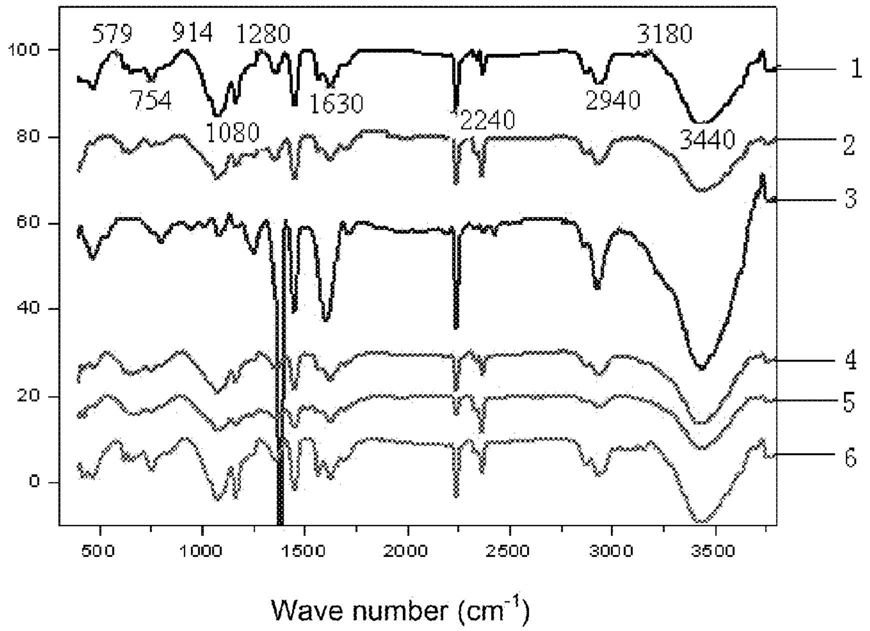

1-butyl-3-methylimidazolium chloride ionic liquid and PAN powder are added in a reactor with mechanical stirrer. Upon the polymer is completely dissolved, a catalyst KMnO4 is added to facilitate cyclization of PAN. The weight percent of the above material are as follows: PAN, 5%; solvent, 95%. $KMnO_4$ is added at 0.05 wt. % of PAN. The mixture is stirred at 170° C., oxygen is blown into the reactor at certain flow rate. The temperature and time of pre-oxidization is controlled and samples are collected when the reaction time is 20 min, 40 min, 60 min and 90 min, respectively, to get PAN spinning solutions with different pre-oxidization degree. FIG. 19-2 shows an improved process of producing PAN based carbon fibre used in this example. FIG. 20-1 shows infrared spectra of PAN/IL pre-oxidized at 170° C. for different time. It can be seen from the spectra that as the pre-oxidization time increases, the intensity of the absorption peak of —C≡N group decreases and that of —C=N group increases, and the intramolecular cyclization degree increases.

Example 28

1-butyl-3-methylimidazolium chloride ionic liquid and PAN are added in a reactor with mechanical stirrer. Upon the polymer is completely dissolved, a catalyst KMnO4 is added to facilitate cyclization of PAN. The weight percent of the above material are as follows: PAN, 5%; solvent, 95%. $KMnO_4$ is added at 0.05 wt. % of PAN. The mixture is stirred at 160° C., oxygen is blown into the reactor at 5 ml/min. The temperature and time of pre-oxidization is controlled and samples are collected when the reaction time is 20 min, 40 min, 60 min, 90 min, 120 min and 150 min, respectively, to get PAN spinning solutions with different pre-oxidization degree. FIG. 20-2 shows infrared spectra of PAN/IL pre-oxidized at 160° C. for different time. It can be seen from the spectra that as the pre-oxidization time increases, the intensity of the absorption peak of —C≡N group decreases and that of —C=N group increases, and the intramolecular cyclization degree increases. However, the cyclization degree at 160° C. is lower than that at 170° C.

Example 29

Figure 21:
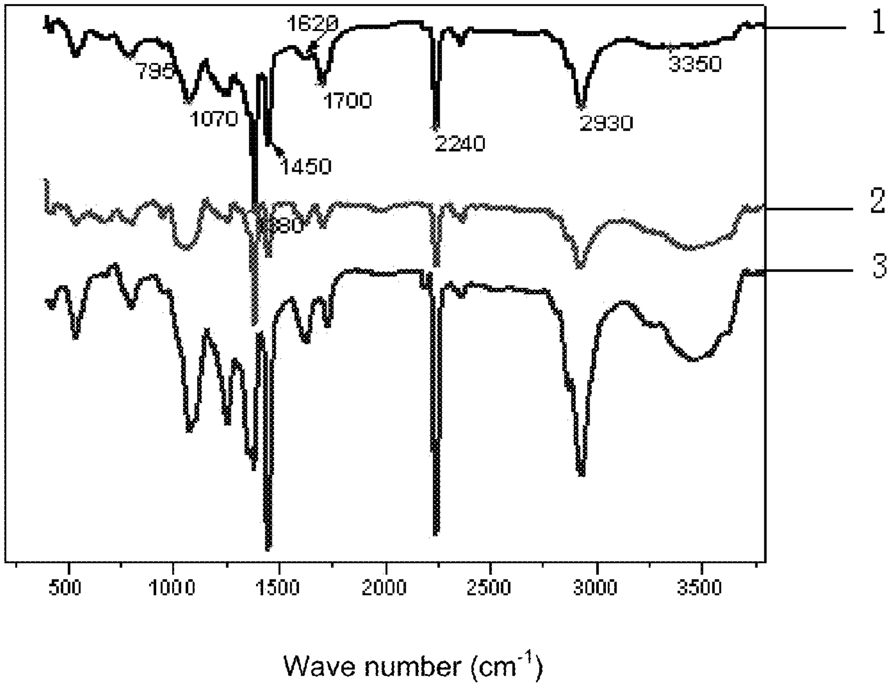
FIG. 21 shows the infrared spectra of PAN/DMSO pre-oxidized at 175° C. for different times, 1: 4 hrs; 2: 5 hrs; 3: not pre-oxidized.

DMSO and PAN are added in a reactor with mechanical stirrer. Upon the polymer is completely dissolved, a catalyst KMnO4 is added to facilitate cyclization of PAN. The weight percent of the above material are as follows: PAN, 10%; DMSO, 90%. $KMnO_4$ is added at 0.05 wt. % of PAN. The mixture is stirred at 175° C., oxygen-containing gas is blown into the reactor at a rate of 5 ml/min. The temperature and time of pre-oxidization is controlled, and pre-oxidization is proceeded for about 4-5 hrs to get PAN spinning solution. FIG. 21 shows infrared spectra of PAN/DMSO pre-oxidized at 175° C. for different time. It can be seen from the spectra that as the pre-oxidization time increases, the intensity of the absorption peak of —C≡N group decreases and that of —C=N group increases, and the intramolecular cyclization degree increases.

Comparative Example 1

Figure 22:
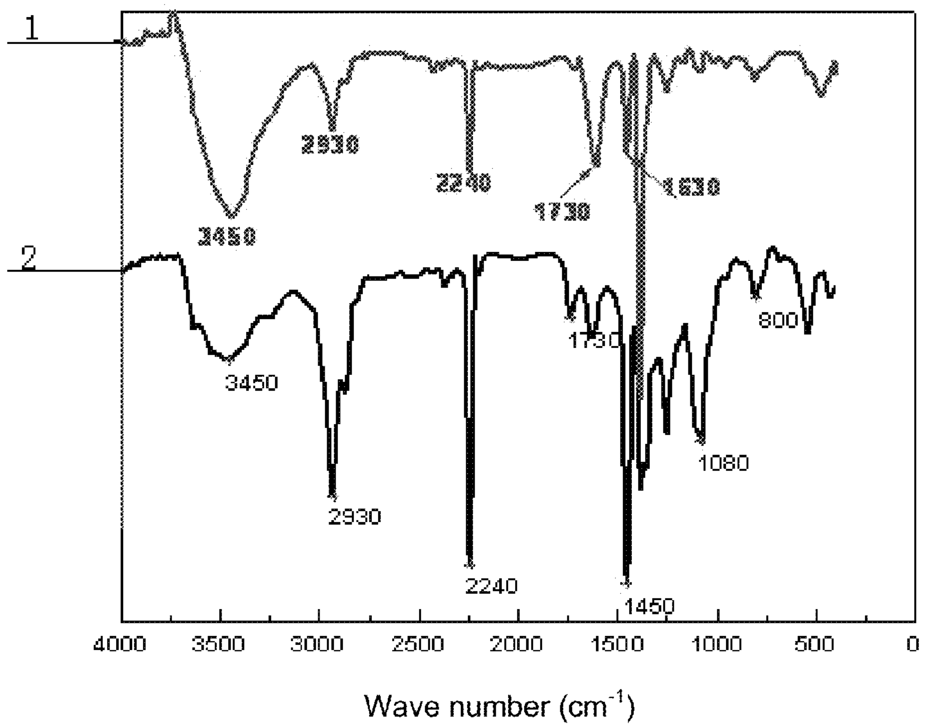
FIG. 22 shows the infrared spectra of PAN precursor fibre pre-oxidized in oxidization furnace, 1: pre-oxidized at 250° C.; 2: not pre-oxidized.

First, a PAN/DMSO spinning solution is wet spun by conventional process. Then PAN precursor fibres are obtained after a series of post-treatments. PAN precursor fibre is pre-oxidized in a pre-oxidization furnace with 6 heating sections with the onset temperature of 170° C., the temperature is warmed up 10° C./10 min, while samples of pre-oxidized fibres are collected at different temperature, and finally maintained at 260° C. for 0.5 hr. The samples of pre-oxidized fibres are subjected to infrared analysis and compared with that obtained from the above two systems in terms of pre-oxidization degree. It has been found that the new process of spinning after the spinning solution being pre-oxidized can reach the same pre-oxidization degree as that obtained from conventional process, however, the pre-oxidization cost of the new process can be substantially decreased, and therefore the manufacturing cost of carbon fibres is decreased. FIG. 22 shows infrared spectra of PAN precursor fibre pre-oxidized in oxidization furnace. Compared with Examples 27, 28 and 29, the oxidization degree of comparative example 1 is comparative with that of Examples 27, 28 and 29, however the oxidization effect of examples 27, 28 and 29 is better and the process is simpler, therefore the cost of the subsequent carbon fibres manufacturing can be decreased.

The basic principle, main characteristics and advantages of the invention are illustrated and described above. It should be understood by the skilled in the art that the examples and description are used to illustrate the principle of the invention and should not be taken as limiting the scope of the invention, and there will be various changes and modifications without departing the sprit and scope of the invention and those changes and modifications fall within the scope of the invention. The scope of the invention is defined by the accompanying claims and equivalents thereof.

The invention claimed is:

1. A process for producing a PAN based carbon fibre, comprising the following steps:

a) mixing PAN and a solvent in a solid-to-liquid ratio of 0.1%-25% in a reactor, and heating and stirring the resulting mixture until the PAN is dissolved completely to obtain a solution;

b) adding a catalyst in an amount of 0.05 wt. %-0.1 wt. % based on the weight of the PAN to the solution from step a), followed by bubbling an oxygen-containing gas at 5 ml/min to obtain a spinning solution, then pre-oxidizing the spinning solution for 1-2.5 hrs at 60° C.-250° C.;

c) spinning the spinning solution through a spinning machine, followed by washing with water, drawing and thermosetting to obtain a pre-oxidized fibre with good pre-oxidization degree, which is subjected to a carbonization process to obtain a high-performance carbon fibre.

2. The process according to claim 1, characterised in that the solvent used in step a) is selected from the group consisting of 1-butyl-3-methylimidazolium chloride, 1-allyl-3-methylimidazolium chloride, dimethylformamide (DMF), dimethylacetamide (DMAc), dimethylsulfoxide (DMSO), sodium thiocyanate (NaSCN), nitric acid ($HNO_3$), and Zinc chloride ($ZnCl_2$).

3. The process according to claim 1, characterised in that the catalyst used in step b) is one or more selected from the group consisting of potassium permanganate ($KMnO_4$), cobalt dichloride ($CoCl_2$), cobalt sulphate ($CoSO_4$), benzoyl peroxide (BPO), succinic acid, hydrogen peroxide ($H_2O_2$), ammonia, and low molecular weight amine.

4. The process according to claim 1, characterised in that the oxygen-containing gas used in step b) is oxygen or air.

5. The process according to claim 1, characterised in that the pre-oxidization in step b) is carried for 1-1.5 hrs at 60° C.-160° C.

6. The process according to claim 1, characterised in that the pre-oxidization in step b) is carried for 1.5-2 hrs at 165° C.-250° C.

7. The process according to claim 1, characterised in that the spinning process used in step c) is wet spinning, dry-wet spinning, gel spinning, liquid crystal spinning or jelly spinning.

* * * * *